United States Patent [19]

Lang et al.

[11] 4,336,034

[45] Jun. 22, 1982

[54] PROCESS FOR THE CATALYTIC GASIFICATION OF COAL

[75] Inventors: Robert J. Lang, Baytown; Joanne K. Pabst, Crosby, both of Tex.

[73] Assignee: Exxon Research & Engineering Co., Florham Park, N.J.

[21] Appl. No.: 128,799

[22] Filed: Mar. 10, 1980

[51] Int. Cl.$^3$ .............................. C10J 3/00; C10J 3/46
[52] U.S. Cl. ........................................ 48/202; 48/206; 252/373
[58] Field of Search .................... 48/197 R, 20 L, 206, 48/210; 252/373

[56] References Cited

U.S. PATENT DOCUMENTS

| | | | |
|---|---|---|---|
| 4,069,304 | 1/1978 | Starkovich et al. | 423/657 |
| 4,092,125 | 5/1978 | Stambaugh et al. | 48/202 |
| 4,094,650 | 6/1978 | Koh et al. | 48/202 |
| 4,157,246 | 6/1979 | Eakman et al. | 48/197 R |
| 4,204,843 | 5/1980 | Neavel | 48/202 |

FOREIGN PATENT DOCUMENTS 8734 of 1910 United Kingdom.
2010315 6/1979 United Kingdom.

OTHER PUBLICATIONS

Johnson, J. L., "The Use of Catalysts in Coal Gasification", Catal. Rev.-Sa:Eng., 14(1), 1976, pp. 131-152.

Primary Examiner—Peter F. Kratz
Attorney, Agent, or Firm—Yale S. Finkle

[57] ABSTRACT

Carbonaceous solids are contacted in the presence of water with potassium sulfate and a calcium compound selected from the group consisting of calcium oxide, calcium hydroxide, and calcium carbonate thereby producing treated carbonaceous solids which are then gasified. The calcium compound apparently activates the relatively noncatalytic potassium sulfate thereby producing a substantial catalytic effect on the gasification reactions.

9 Claims, 7 Drawing Figures

PROCESS FOR THE CATALYTIC GASIFICATION OF COAL

BACKGROUND OF THE INVENTION

This invention relates to the gasification of carbonaceous solids and is particularly concerned with a catalytic gasification process utilizing a catalyst containing potassium sulfate.

It has long been recognized that certain alkali metal compounds can be employed to catalyze the gasification of carbonaceous materials such as coal and other carbonaceous solids. Studies have shown that potassium carbonate, sodium carbonate, cesium carbonate and lithium carbonate will substantially accelerate the rate at which steam, hydrogen, carbon dioxide, oxygen and the like react with bituminous coal, subbituminous coal, lignite, petroleum coke, organic waste materials and similar carbonaceous solids to form methane, carbon monoxide, hydrogen, carbon dioxide and other gaseous products. Other alkali metal salts such as potassium sulfate, however, have a low catalytic activity when compared to that of the corresponding carbonate and will only accelerate the gasification reactions at a small fraction of the rate obtainable with the alkali metal carbonates. It has been found that of the alkali metal carbonates, cesium carbonate is the most effective gasification catalyst, followed by potassium carbonate, sodium carbonate and lithium carbonate, in that order. Because of the relatively high cost of cesium carbonate and the low effectiveness of lithium carbonate, most of the experimental work in this area which has been carried out in the past has been directed toward the use of potassium and sodium carbonate. The catalytic activity of sodium carbonate, however, is substantially lower than that of potassium carbonate, therefore attention has been focused in the past on the use of potassium carbonate as a gasification catalyst.

In addition to utilizing an individual alkali metal salt as a catalyst for the gasification of a carbonaceous material, it has been proposed to utilize mixtures of alkali metal salts and mixtures comprising an alkali metal hydroxide and an alkaline earth metal hydroxide or carbonate. It has also been proposed to use a mixture of sodium and calcium cations that are ion exchanged onto lower ranking coals such as lignites. When mixtures of catalytic compounds possessing different activities are used to promote the gasification of a carbonaceous feed material, it is expected that the mixture will accelerate the gasification reactions less than if an equivalent amount of the more active compound is used alone and more than if an equivalent amount of the less active compound is used alone. In a recent publication concerning the use of catalysts in coal gasification it was concluded that there is a substantial need for additional research in general areas relating to the use of catalysts in coal gasification. Specifically, it was suggested that a study of catalyst combinations would be a promising area for future research.

In gasification processes utilizing alkali metal-containing catalysts, the cost of the catalyst is a significant factor in determining the overall cost of the product gas. Potassium carbonate is relatively expensive, costing approximately $12.48 per pound mole of potassium. Thus, when potassium carbonate is utilized as a catalyst it is essential that the potassium constituents in the spent solids produced during gasification of the carbonaceous feed material be recovered and reused in the process in order to maintain catalyst cost at a reasonable level. When these potassium constituents are removed from the spent solids exiting the gasifier by water leaching, it has been found that only a portion of the potassium carbonate is recovered and that substantial quantities of makeup alkali metal compounds are therefore required. This adds appreciably to the cost of the gasification operation. In order to decrease the amount of alkali metal makeup compounds necessary, it has been suggested to further treat the char from the gasifier to recover water-insoluble alkali metal constituents by more sophisticated and expensive recovery techniques.

Potassium sulfate, which costs about $2.12 per pound mole of potassium is substantially cheaper than potassium carbonate but has been found to possess only a fraction of the catalytic activity exhibited by potassium carbonate. It would be highly desirable if relatively inexpensive potassium sulfate could be effectively used as a gasification catalyst thereby substantially decreasing the initial investment required in the catalyst and obviating the need for expensive secondary recovery techniques to decrease the amount of makeup catalytically active compounds that would otherwise be required to maintain the catalyst inventory at the required level.

SUMMARY OF THE INVENTION

The present invention provides an improved process for the catalytic gasification of carbonaceous solids. In accordance with the invention, it has now been found that catalyst costs incurred during the gasification of bituminous coal, subbituminous coal, lignite, organic waste materials, petroleum coke, coal liquefaction bottoms, oil shale, and other carbonaceous solids can be significantly reduced while at the same time obtaining unexpectedly high gasification rates by employing a mixture of potassium sulfate and an inexpensive calcium compound selected from the group consisting of calcium oxide, calcium hydroxide, and calcium carbonate. Laboratory tests have shown that when coal is contacted with potassium sulfate and calcium hydroxide or calcium carbonate in the presence of water and subsequently subjected to gasification, surprisingly high gasification rates are obtained. These gasification rates are substantially higher than expected based on the low activity of potassium sulfate, calcium oxide, calcium carbonate, and calcium hydroxide relative to that of potassium carbonate. This is a significant and unexpected discovery since the observed gasification rates are high enough to enable mixtures of potassium sulfate and calcium hydroxide, calcium oxide or calcium carbonate to be used as gasification catalysts in lieu of the substantially more expensive potassium carbonate. The gasification rate obtained will normally be greater than the weighted average of the separate rates obtained by gasifying the carbonaceous solids in the presence of potassium sulfate only and gasifying the carbonaceous solids in the presence of calcium hydroxide, calcium oxide or calcium carbonate only; wherein the weighted average is based upon the concentration of the potassium sulfate and calcium hydroxide, calcium oxide or calcium carbonate expressed respectively in potassium-to-carbon and calcium-to-carbon atomic ratios. Evidently, the calcium compound activates the poorly catalytic potassium sulfate thereby producing a substantial catalytic effect on the gasification rate of the carbonaceous feed solids.

In accordance with the invention, the use of catalysts comprised of a mixture of potassium sulfate and inexpensive calcium oxide, calcium hydroxide or calcium carbonate reduces the initial catalyst cost and the cost of the makeup catalyst and at the same time permits the attainment of high gasification rates. The use of such mixtures also obviates the need for expensive secondary catalyst recovery procedures. As a result, the invention makes possible substantial savings in gasification operations and permits the generation of product gases at significantly lower costs than would normally otherwise be the case.

DESCRIPTION OF THE PREFERRED EMBODIMENTS

Figure 1:
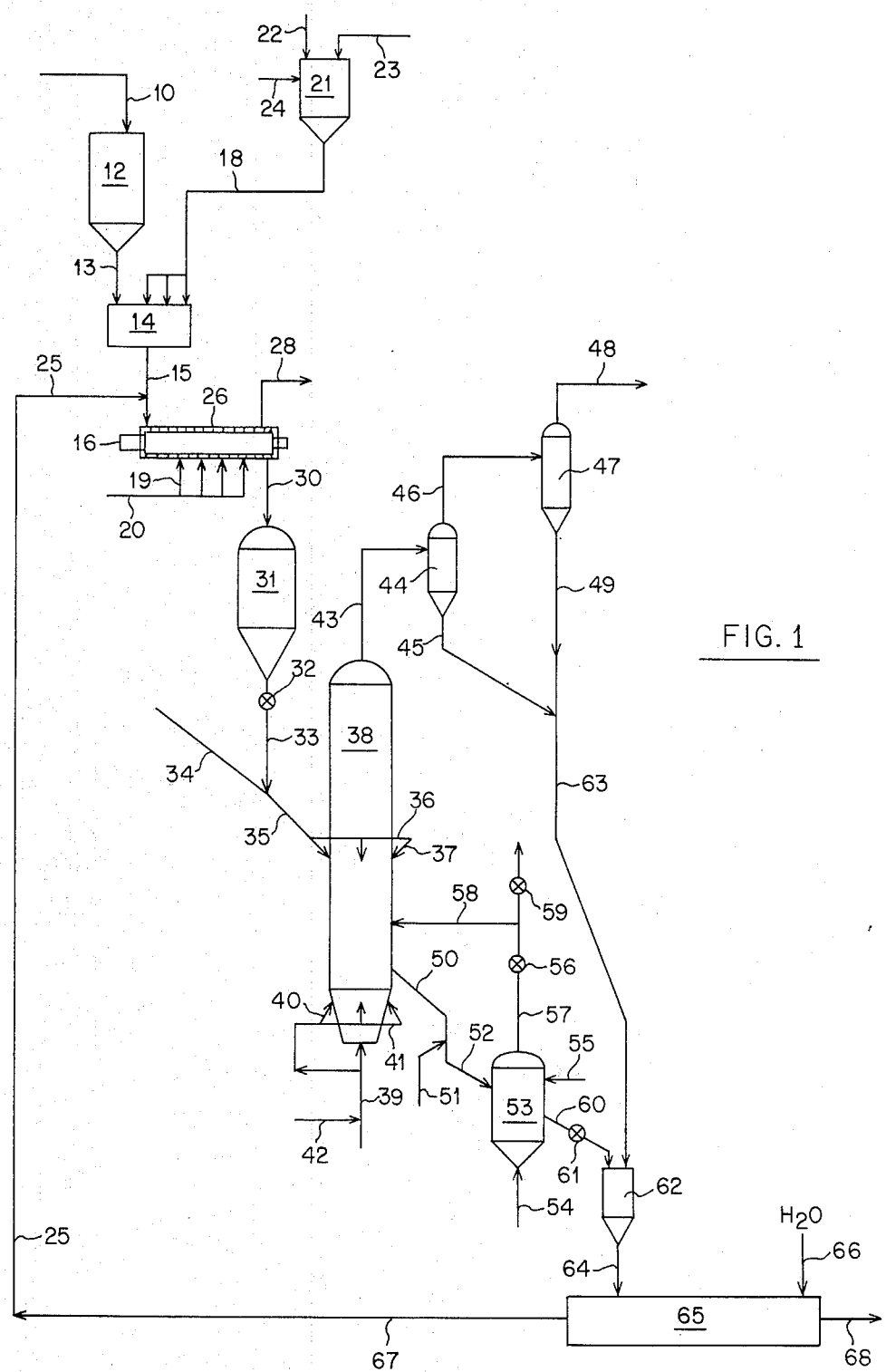
FIG. 1 in the drawings is a schematic flow diagram of a process for the gasification of coal carried out in accordance with the invention.

The process depicted in FIG. 1 is a process for the gasification of bituminous coal, subbituminous coal, lignite, coal liquefaction bottoms, oil shale, organic waste materials or similar carbonaceous solids in the presence of added potassium sulfate and calcium oxide, calcium hydroxide or calcium carbonate. It will be understood that the invention is not restricted to this particular gasification process and instead may be employed in any of a wide variety of fixed bed, moving bed and fluidized bed gasification operations in which a catalyst is used to promote the reaction of oxygen, steam, hydrogen, carbon dioxide, or a similar gasification agent with carbonaceous feed materials; and in which a char, coke or solid product containing catalyst residues is recovered. Many such operations have been described in the technical literature and will be familiar to those skilled in the art.

In the process shown, subbituminous coal, lignite or a similar low rank coal, which has been crushed and screened to a particle size of about 8 mesh or smaller on the U.S. Sieve Series Scale, is fed into the system through line 10 from a coal preparation plant or storage facility which is not shown in the drawing. The solids introduced through line 10 are fed into a hopper or similar vessel 12 from which they are passed through line 13 into ribbon mixer or similar mixing zone 14. Here the solids are contacted and mixed with an aqueous slurry of potassium sulfate and a calcium compound introduced into the mixer through line 18. The aqueous slurry fed through line 18 is prepared by introducing potassium sulfate and either calcium hydroxide, calcium oxide or calcium carbonate into mixing vessel 21 as indicated by lines 22 and 23, respectively, and dissolving and slurrying these compounds in water admitted through line 24. A sufficient amount of aqueous slurry is fed through line 18 so that the resultant coal slurry formed in mixing zone 14 will contain between about 50 and about 90 weight percent solids. The residence time of the coal slurry in the mixing zone is not critical and will normally be maintained such that the coal and aqueous slurry are in contact for a time ranging between about 1 and about 240 minutes, preferably between about 30 and about 120 minutes. The coal and aqueous slurry will normally be subjected during contacting in the mixing zone to a temperature between about 40° F. and about 180° F., preferably between about 60° F. and about 120° F. The pressure in the mixing zone will normally range between about 0 psig and about 15 psig. The contacting in the mixing zone will normally be carried out at about atmospheric pressure and ambient temperature.

The potassium sulfate introduced into mixing vessel 21 through line 22 is moderately soluble in water. The calcium oxide, calcium hydroxide or calcium carbonate introduced into vessel 21 via line 23 is less soluble in water than potassium sulfate and therefore none of these calcium compounds will interact with potassium sulfate to form reaction products. In particular, the potassium sulfate will not interact with calcium hydroxide to form potassium hydroxide and a calcium sulfate precipitate. Since only a portion of the potassium sulfate and calcium compound introduced into mixing vessel 21 will dissolve in the water introduced into the vessel through line 24, an aqueous slurry containing undissolved potassium sulfate and an undissolved calcium compound will be formed in the vessel. In general, a sufficient amount of the calcium compound is introduced into mixing vessel 21 to provide a potassium-to-calcium atomic ratio in the aqueous slurry of between about 0.5 and about 10, preferably between about 1.33 and about 4.0. Normally a potassium-to-calcium atomic ratio of about 2.0 is an optimum. This ratio corresponds to a stoichiometric amount or one equivalent of the calcium compound.

In the embodiment of the invention depicted in the drawing and described above, coal is contacted simultaneously with potassium sulfate and a calcium compound in mixing zone 14. It will be understood that the process of the invention is not limited to simultaneous contacting but also encompasses the case where the coal is first contacted with potassium sulfate in the presence of water and subsequently contacted with the calcium compound or vice versa.

It has been surprisingly found that when mixtures of potassium sulfate and either calcium oxide, calcium hydroxide or calcium carbonate are contacted with a solid carbonaceous feed material in the presence of water and the resultant treated carbonaceous feed solids are subsequently gasified in a catalytic gasification zone, gasification rates are obtained that are much greater than those that would normally be expected by one of ordinary skill in the art. Apparently, the poorly catalytic potassium sulfate is activated by the calcium compound thereby producing a substantial catalytic effect on the gasification rate of the carbonaceous feed material. Normally, a concentration of the calcium compound sufficient to yield a potassium-to-calcium atomic ratio of about 2.0 will completely activate the potassium sulfate.

The actual mechanism by which the calcium compound activates the potassium sulfate in the presence of the carbonaceous feed solids is not fully understood. Potassium sulfate alone is a very poor catalyst apparently because the sulfate anions tie up the potassium cations and thereby prevent them from associating with acidic sites in the carbonaceous solids. It is believed, however, that the calcium compound activates the potassium sulfate through an ion exchange mechanism. It is believed that the anions from the calcium compound react with protons from ion-exchange or acidic sites of the carbonaceous material thereby liberating the calcium cations. Since calcium sulfate is much more insoluble than potassium sulfate, the liberated calcium cations will react with the sulfate anions to form a calcium sulfate precipitate. The sulfate anions which previously tied up the potassium cations are now tied up themselves as insoluble calcium sulfate and the potassium cations are free to associate at acidic sites in the carbonaceous feed solids thereby resulting in treated solids that yield a high gasification rate.

Referring again to FIG. 1, the aqueous coal slurry formed in mixing zone 14 is withdrawn through line 15 and mixed with a potassium-containing solution recycled through line 25 from the catalyst recovery portion of the process which is described in more detail hereafter. The resultant mixture of aqueous coal slurry and recycle potassium-containing solution is then passed into drying zone 26. The drying zone shown includes a screw conveyor or similar device, not shown in the drawing, which is powered by motor 16, and a series of nozzles or the like 19 for the introduction of a hot dry gas, such as flue gas, from line 20 into the drying zone to heat the solids and drive off moisture. A mixture of water vapor and gas is withdrawn from drying zone 26 through line 28 and will normally be passed to a condenser or heat exchanger, not shown, from which water may be recovered for use as makeup or the like. Normally, a sufficient amount of potassium sulfate is introduced into mixing vessel 21 so that the dried coal exiting drying zone 26 will contain a potassium-to-carbon atomic ratio in excess of about 0.01, preferably between about 0.02 and about 0.07.

The solids exiting drying zone 26 and impregnated with potassium and calcium compounds are passed through line 30 to feed hopper or similar vessel 31. From here they are discharged through a star wheel feeder or a similar device 32 into line 33 at an elevated pressure sufficient to permit their entrainment in a stream of steam, recycle product gas, inert gas or other carrier gas introduced into the system through line 34. The carrier gas and entrained solids are passed through line 35 into manifold 36 and fed through multiple feed lines 37 and nozzles, not shown in the drawing, into gasifier 38. In lieu of or in addition to hopper 31 and star wheel feeder 32, the feed system employed may include parallel lock hoppers, pressurized hoppers, aerated standpipes operated in series, or other apparatus for raising the input feed solids stream to the required pressure level.

Gasifier 38 comprises a refractory lined vessel containing a fluidized bed of carbonaceous solids extending upward within the vessel above an internal grid or similar distribution device not shown in the drawing. The solids are maintained in the fluidized state within the gasifier by means of a mixture of steam and air or oxygen injected through bottom inlet 39 and multiple nozzles 40 connected to manifold 41. Sufficient air or oxygen is added to the steam through line 42 to maintain the fluidized bed at the desired temperature. The gasifier pressure will normally be between atmospheric and about 2000 psig, preferably between about 100 psig and about 800 psig, and most preferably between about 400 psig and about 600 psig. The temperature maintained in the gasifier will normally range between about 1000° F. and about 1600° F., preferably between about 1100° F. and about 1500° F., and most preferably between about 1200° F. and about 1400° F. Under these conditions, the added potassium sulfate and calcium compound result in the production of an unexpected and substantial catalytic effect on the steam gasification reaction thereby resulting in the production of a gas composed primarily of hydrogen, carbon monoxide and carbon dioxide. Other reactions will also take place and some methane will normally be formed depending on the gasification conditions. In some cases it may be desirable to recycle carbon monoxide and hydrogen to the gasifier and thereby avoid the net production of carbon monoxide and hydrogen with the result that the net reaction products are carbon dioxide and methane. Such gasification systems are described in detail in U.S. Pat. Nos. 4,094,650 and 4,118,204, the disclosures of which are hereby incorporated by reference. In such systems a portion of the heat required is supplied by the exothermic reactions that take place in the gasifier upon the injection of the carbon monoxide and hydrogen, and the use of air or oxygen is normally not required.

The gas leaving the fluidized bed in gasifier 38 passes through the upper section of the gasifier, which serves as a disengagement zone where particles too heavy to be entrained by the gas leaving the vessel are returned to the bed. If desired, this disengagement zone may include one or more cyclone separators or the like for removing relatively large particles from the gas. The gas withdrawn from the upper part of the gasifier through line 43 is passed to cyclone separator or similar device 44 for removal of larger fines. The overhead gas then passes through line 46 into a second separator 47 where smaller particles are removed. The gas from which the solids have been separated is taken overhead from separator 47 through line 48 and the fines are discharged downward through dip legs 45 and 49. These fines may be returned to the gasifier or passed to the catalyst recovery section of the process as discussed hereafter. After entrained solids have been separated from the raw product gas, the gas stream may be passed through suitable heat exchange equipment for the recovery of heat and subsequently passed downstream for further processing.

Char particles containing carbonaceous material, ash, and potassium and calcium residues are continuously withdrawn through line 50 from the bottom of the fluidized bed in gasifier 38. The particles flow downward through line 50 countercurrent to a stream of steam or other elutriating gas introduced through line 51. Here a preliminary separation of solids based on differences in size and density takes place. The lighter particles containing a relatively large amount of carbonaceous material tend to be returned to the gasifier and the heavier particles having a relatively high content of ash and potassium and calcium residues continue downward through line 52 into fluidized bed withdrawal zone 53. Steam or other fluidizing gas is introduced into the bottom of the withdrawal zone through line 54 to maintain the bed in the fluidized state. Water may be introduced through line 55 in order to cool the particles and facilitate their further processing. The withdrawal rate is controlled by regulating the pressure within zone 53 by means of throttle valve 56 in overhead line 57. The gases from line 57 may be returned to the gasifier through line 58 or vented through valve 59. From vessel 53 the solid particles are passed through line 60 containing valve 61 into hopper 62. The char fines recovered from the raw product gas through dip legs 45 and 49 may be combined with the char particles withdrawn from the gasifier by passing the fines through line 63 into hopper 62.

The particles in hopper 62 will normally contain potassium and calcium residues composed of water-soluble and water-insoluble potassium and calcium compounds. These particles are passed from hopper 62 through line 64 into catalyst recovery unit 65. The catalyst recovery unit will normally comprise a multistage countercurrent extraction system in which the particles containing the potassium and calcium residues are countercurrently contacted with water introduced through line 66. An aqueous solution of potassium compounds, which may also contain calcium compounds, is recovered from the unit and may be recycled through lines 67 and 25 to drying zone 26. Particles from which substantially all of the soluble potassium and calcium constituents have been extracted are withdrawn from the catalyst recovery unit through line 68. These solids will normally contain substantial quantities of potassium present in the form of potassium aluminosilicates and other water-insoluble compounds. These compounds are formed in part by the reaction with the mineral matter in the coal or other feed material of potassium compounds added to catalyze the gasification reaction. In general, depending upon the mineral matter content of the coal, from about 15 percent to as much as 50 percent of the added potassium constituents will be converted into potassium aluminosilicates and other water-insoluble compounds. By employing a mixture of inexpensive potassium sulfate and calcium oxide, calcium hydroxide or calcium carbonate in accordance with the process of the invention in lieu of the more expensive potassium carbonate and other previously known catalysts, the need to recover and reuse the potassium compounds tied up as water-insoluble residues by expensive and sophisticated secondary recovery methods is obviated.

The nature and objects of the invention are further illustrated by the results of laboratory gasification studies which show that unexpectedly high gasification rates are obtained by utilizing a combination of potassium sulfate and calcium hydroxide or calcium carbonate as a catalyst. In the first series of tests, about 2 grams of Wyodak coal, a low rank subbituminous coal, was crushed and mixed with varying amounts of finely divided potassium carbonate, potassium sulfate, calcium hydroxide, calcium carbonate and combinations of potassium sulfate and calcium hydroxide or calcium carbonate. The resultant mixture was then dampened with about one milliliter of distilled water and was either immediately pyrolyzed for about 15 minutes at about 1400° F. in a retort under an inert nitrogen atmosphere to remove volatile hydrocarbons or allowed to soak for a predetermined amount of time at ambient conditions prior to pyrolysis. A portion of the char obtained after pyrolysis, which contained between about 0.2 and about 0.5 grams of carbon, was crushed to between about 30 and about 100 mesh on the U.S. Sieve Series Scale then steam-gasified at a temperature of about 1200° F., 1300° F. or 1400° F., and essentially atmospheric pressure in a laboratory bench scale gasification unit. The gasification rate obtained for each char sample was determined. The char not gasified was ashed to determine the amount of carbon present and the potassium-to-carbon and calcium-to-carbon atomic ratios were then calculated. The results of these tests are set forth in FIGS. 2 through 6. In all cases the gasification rate is expressed as the conversion weighted average rate in percent of carbon present per hour over the interval of 0-90% carbon conversion.

Figure 2:
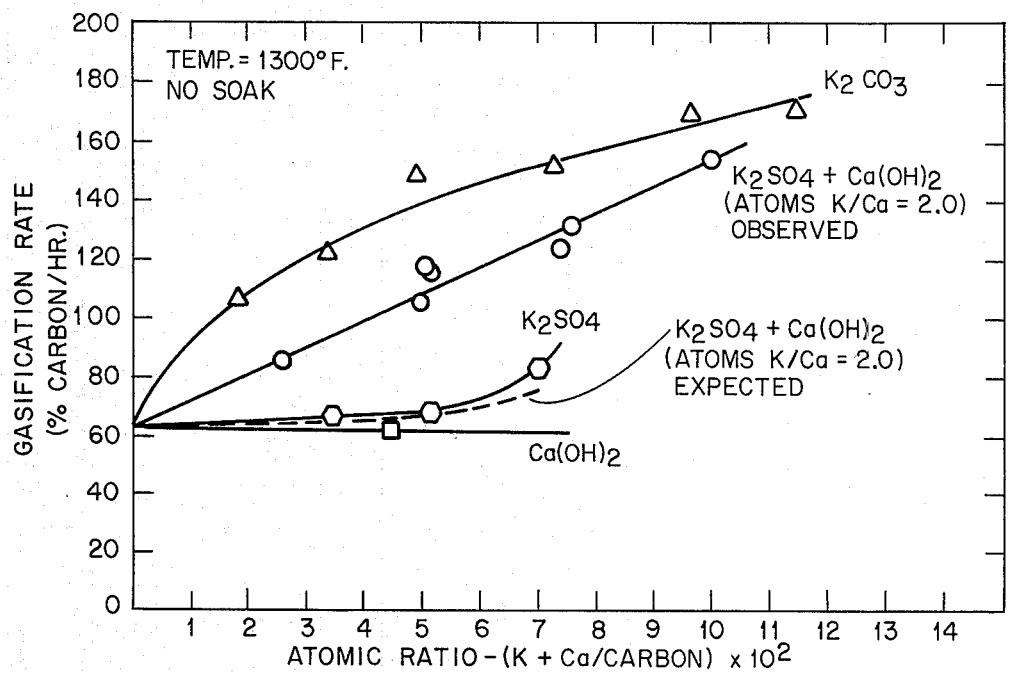
FIG. 2 is a plot illustrating that unexpectedly high gasification rates are obtained when gasifying a low rank coal at 1300° F. by first treating the coal with an equimolar aqueous mixture of potassium sulfate and calcium hydroxide.

FIG. 2 sets forth the steam gasification rate data obtained at 1300° F. from a Wyodak coal char impregnated with various concentrations of potassium carbonate, potassium sulfate, calcium hydroxide and a mixture of potassium sulfate and calcium hydroxide. The char was prepared as described above without any soaking prior to pyrolysis. It can be seen in FIG. 2 that relatively expensive potassium carbonate yielded much greater gasification rates than did the less expensive potassium sulfate and calcium hydroxide and is therefore a much more active gasification catalyst than either of the latter two compounds.

The dashed line in FIG. 2 represents the weighted average of the gasification rates observed at a particular potassium-to-carbon atomic ratio when using potassium sulfate alone as a catalyst and at a particular calcium-to-carbon atomic ratio when using calcium hydroxide alone as a catalyst, and therefore illustrates the gasification rates that one of ordinary skill in the art would expect to observe when a mixture of potassium sulfate and calcium hydroxide is used as a catalyst. The weighted average of the observed gasification rates is based upon the concentration of the potassium sulfate and calcium hydroxide expressed respectively in potassium-to-carbon and calcium-to-carbon atomic ratios. The expected gasification rate for such a mixture which was equimolar in potassium sulfate and calcium hydroxide (atoms K/Ca=2.0) and yielded an atomic ratio of 0.045 potassium plus calcium atoms per carbon atom was calculated as follows. The observed rate of about 62 percent carbon per hour for a concentration of calcium hydroxide that yielded an atomic ratio of 0.045 calcium atoms per carbon atom was added to twice the observed rate of about 68 percent carbon per hour for a concentration of potassium sulfate that yielded an atomic ratio of 0.045 potassium atoms per carbon atom and the resultant value of 198 percent carbon per hour was divided by 3 to yield the expected rate of 66 percent carbon per hour. This rate was then plotted against the atomic ratio of 0.045 where 0.03 of the atoms were potassium atoms and the other 0.015 were calcium atoms. The expected gasification rates for equimolar mixtures of calcium hydroxide and potassium sulfate that yield atomic ratios of other values were calculated in a manner similar to that described above.

As can be seen in FIG. 2, the actual gasification rates observed using mixtures of potassium sulfate and calcium hydroxide were much greater than the expected rates represented by the dashed line but not as great as the rates obtainable with equivalent concentrations of potassium carbonate. The actual observed gasification rate for an atomic ratio of 0.045 potassium plus calcium atoms per carbon atom was 104 percent carbon per hour as compared to the 66 percent carbon per hour that was expected. Furthermore, the actual observed rate of 104 percent carbon per hour for the mixture at an atomic ratio of 0.045 potassium plus calcium atoms per carbon atom was much greater than the 68 percent carbon per hour obtained for potassium sulfate at an atomic ratio of 0.045 potassium atoms per carbon atom and is also greater than the 62 percent carbon per hour obtained for calcium hydroxide at an atomic ratio of 0.045 calcium atoms per carbon atom. In view of the foregoing, the gasification rates obtained using mixtures of potassium sulfate and calcium hydroxide as a catalyst are surprising and unexpected.

Figure 3:
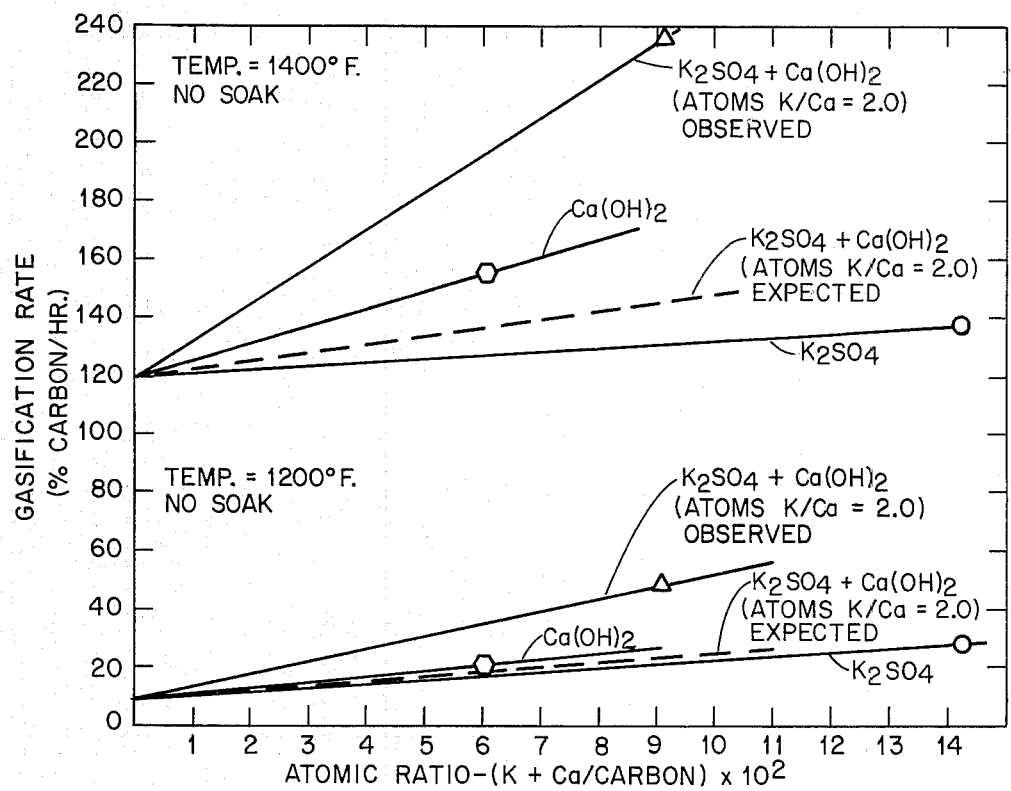
FIG. 3 is a plot illustrating that unexpectedly high gasification rates are obtained when gasifying a low rank coal at 1200° F. and 1400° F. by first treating the coal with an equimolar aqueous mixture of potassium sulfate and calcium hydroxide.

FIG. 3 sets forth the steam gasification rate data obtained at temperatures of 1200° F. and 1400° F. when using equimolar mixtures of potassium sulfate and calcium hydroxide (atoms K/Ca=2.0). As was the case for the experiments whose results are delineated in FIG. 2, the char that was gasified was prepared without any soaking prior to pyrolysis. It can be seen in FIG. 3 that the actual gasification rates observed for the mixture of potassium sulfate and calcium hydroxide at both temperatures were considerably greater than the expected rates, which are again represented by a dashed line and were calculated as discussed previously in reference to FIG. 2. FIGS. 2 and 3 taken together clearly show that unexpectedly high gasification rates are obtained when using mixtures of potassium sulfate and calcium hydroxide at temperatures between 1200° F. and 1400° F. Based on these data it is reasonable to conclude that gasification rates greater than the weighted average of the separate rates obtained by gasification in the presence of potassium sulfate alone and in the presence of calcium hydroxide alone would be obtained over a temperature range of at least about 1100° F. to about 1500° F.

Figure 4:
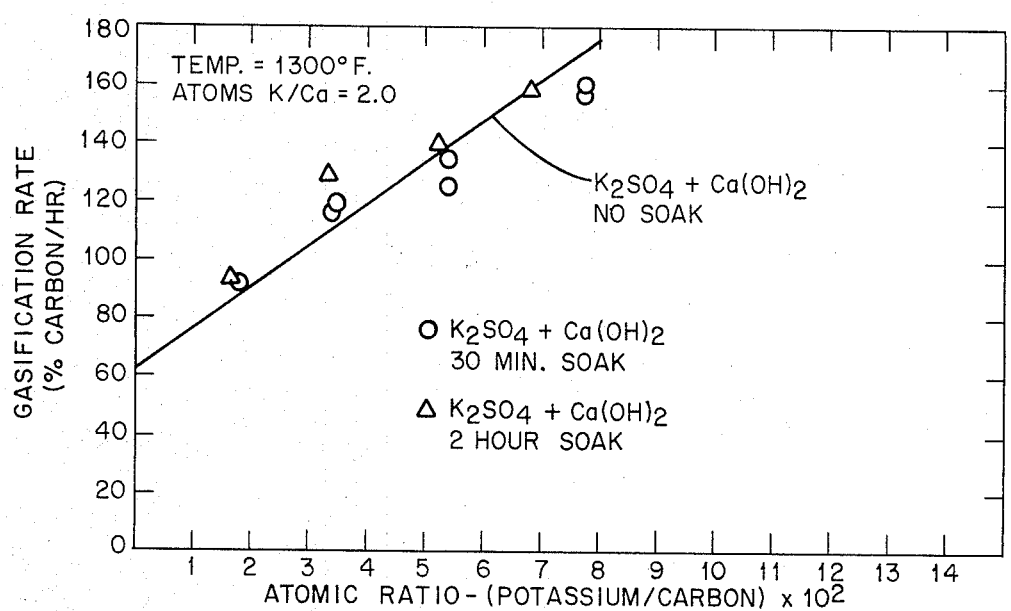
FIG. 4 is a plot illustrating that the amount of time a low rank coal is treated with an equimolar aqueous mixture of potassium sulfate and calcium hydroxide prior to gasification has little effect on the unexpectedly high gasification rates.

FIG. 4 compares the gasification rates obtained at 1300° F. by gasifying Wyodak coal char prepared by pyrolyzing dampened mixtures of Wyodak coal, potassium sulfate and calcium hydroxide that were not allowed to soak at ambient condition prior to pyrolysis with the gasification rates obtained from Wyodak char prepared by pyrolyzing such mixtures that were allowed to soak at ambient conditions for 30 minutes and 2 hours prior to pyrolysis. In all cases the potassium sulfate and calcium hydroxide were present in the char in quantities such that the potassium-to-calcium atomic ratio was about 2.0. The solid line represents the same data that appears as circles in FIG. 2. The gasification rates are plotted in FIG. 4 against the potassium-to-carbon atomic ratios rather than the potassium plus calcium-to-carbon atomic ratios since it is believed that the calcium does not contribute substantially to the gasification rate but serves to tie up the sulfate anions associated with the potassium thereby rendering the potassium catalytically active. As can be seen from FIG. 4, the length of the soak or contact time has a tendency to increase the gasification rate only slightly if at all.

Figure 5:
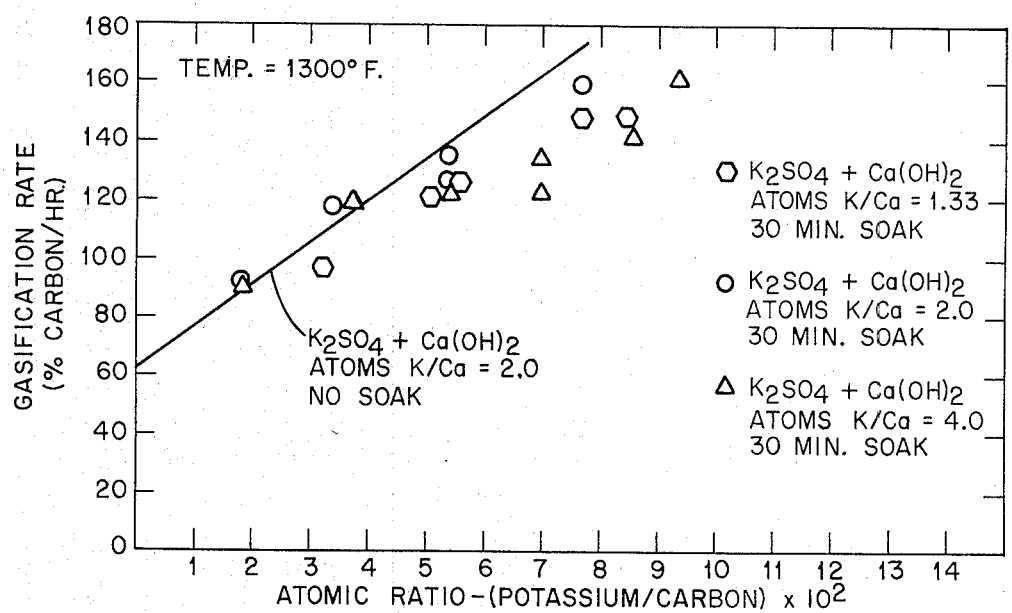
FIG. 5 is a plot illustrating that the optimum amount of calcium hydroxide that should be present in the aqueous mixture used to treat a low rank coal prior to gasification in order to obtain unexpectedly high gasification rates is an amount that yields a potassium-to-calcium atomic ratio of about 2:1.

FIG. 5 shows the gasification rates obtained when Wyodak coal char was gasified at 1300° F. in the presence of catalysts comprised of mixtures of potassium sulfate and calcium hydroxide containing potassium-to-calcium atomic ratios of 1.33, 2.0, and 4.0. The data points plotted in the Figure were obtained from chars prepared by allowing mixtures of dampened Wyodak coal, potassium sulfate and calcium hydroxide to soak at ambient conditions for 30 minutes prior to pyrolysis, whereas the solid line represents data obtained from gasifying char prepared with no soaking prior to pyrolysis. It can be seen from the plotted data that for a potassium-to-calcium range between 1.33 and 4.0, the amount of calcium hydroxide present had only a minor effect on the gasification rate obtained. The triangles, which represent rates obtained with the smallest concentration of calcium hydroxide, tend to fall only slightly below the circles and hexagons. In general, it may be concluded that the optimum amount of calcium hydroxide that should be employed to activate potassium sulfate is a stoichiometric amount—the amount required to yield a potassium-to-calcium atomic ratio of 2.0.

Figure 6:
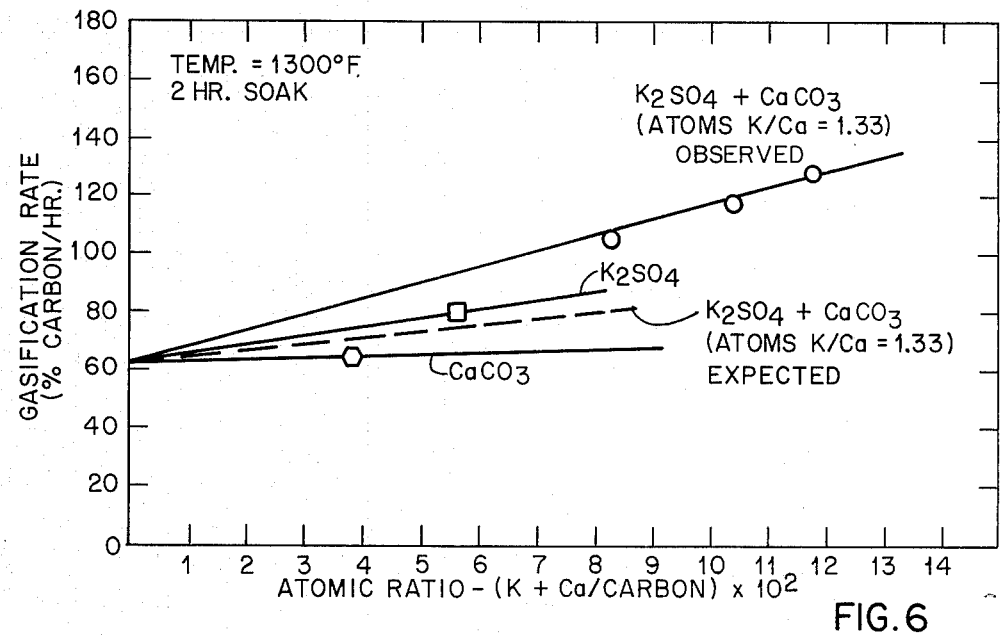
FIG. 6 is a plot illustrating that unexpectedly high gasification rates are obtained when gasifying a low rank coal at 1300° F. by first treating the coal with an aqueous mixture of potassium sulfate and calcium carbonate.

The data set forth in FIG. 6 indicate that surprisingly high gasification rates can also be obtained by utilizing potassium sulfate in combination with calcium carbonate instead of calcium hydroxide. All of the data was obtained by gasifying char produced by pyrolyzing a dampened mixture of Wyodak coal, potassium sulfate and calcium carbonate that had been allowed to stand or soak at ambient conditions for 2 hours. The gasification rates one of oridinary skill in the art would expect are represented by the dashed line and were calculated as discussed previously in reference to FIG. 2. The gasification rates actually observed for the mixture of potassium sulfate and calcium carbonate, like the rates observed for a mixture of potassium sulfate and calcium hydroxide, were greater than the weighted average of the rates obtained by gasification in the presence of potassium sulfate alone and in the presence of calcium carbonate alone and are therefore unexpected.

In the second series of tests, gasification rate data were obtained for Illinois No. 6 coal, a high rank bituminous coal, in the same manner as described in the preceding series of tests except that data were obtained only for potassium sulfate, calcium hydroxide and combinations thereof at 1300° F. The results of these tests are set forth in FIG. 7.

Figure 7:
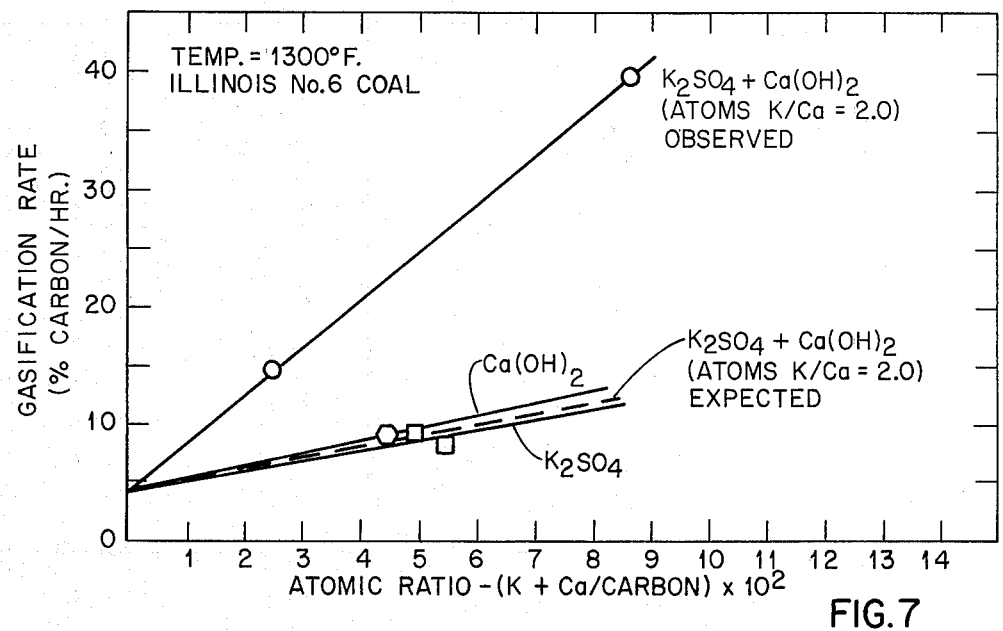
FIG. 7 is a plot illustrating that unexpectedly high gasification rates are obtained when gasifying a high rank coal that has been treated with an aqueous mixture of potassium sulfate and calcium hydroxide.

As can be seen in FIG. 7, the observed gasification rates of Illinois No. 6 coal char using an equimolar mixture of potassium sulfate and calcium hydroxide (atoms K/Ca=2.0) were much greater than the weighted average of the gasification rates observed when using potassium sulfate alone and calcium hydroxide alone. The weighted average rates are represented by the dashed line and are the rates that would normally be expected. Although the gasification rates observed when using a mixture of potassium sulfate and calcium hydroxide with Illinois No. 6 coal are relatively low, below 40% carbon per hour, and indicate that the combination is not a very good gasification catalyst for Illinois No. 6 coal, the data set forth in FIG. 7 do indicate that the same unexpected gasification rates obtained in the first series of tests using mixtures of potassium sulfate and calcium hydroxide or calcium carbonate with a low rank coal are obtained using the same mixtures with a high rank coal.

It will be apparent from the foregoing that the invention provides a process for gasifying a carbonaceous material which makes it possible to employ a mixture of inexpensive potassium sulfate and calcium oxide, calcium hydroxide or calcium carbonate as catalysts and at the same time attain reasonable gasification rates. As a result, the overall cost of the product gas may be substantially reduced.

We claim:

1. A process for the catalytic steam gasification of coal which comprises:
   (a) contacting said coal in the presence of water with potassium sulfate and a calcium compound selected from the group consisting of calcium oxide and calcium hydroxide in a contacting zone to produce a treated coal, wherein said calcium compound is present in a sufficient quantity to activate said potassium sulfate;
   (b) passing said treated coal from said contacting zone into a gasification zone; and
   (c) gasifying said treated coal with steam at a temperature between about 1200° F. and about 1400° F. in said gasification zone, wherein said potassium sulfate and said calcium compound are introduced into said contacting zone in sufficient amounts to obtain gasification rates substantially greater than the weighted average of the separate rates that would be obtained if said potassium sulfate or calcium compound were introduced alone into said contacting zone in sufficient amounts to give a cation-to-carbon atomic ratio equal to the sum of the potassium-to-carbon and calcium-to-carbon atomic ratios given by the amount of said potassium and said calcium compound actually introduced into said contacting zone.

2. A process as defined by claim 1 wherein said calcium compound comprises calcium hydroxide.

3. A process as defined by claim 1 wherein said calcium compound is present in a sufficient quantity to yield a potassium-to-calcium atomic ratio of between about 1.33 and about 4.0.

4. A process as defined by claim 1 wherein said coal is contacted with said potassium sulfate and said calcium compound in the presence of water for a period of time between about 30 minutes and about 120 minutes.

5. A process as defined by claim 1 wherein said coal comprises a low rank coal.

6. A process as defined by claim 1 wherein said calcium compound comprises calcium oxide.

7. A process as defined by claim 3 wherein said calcium compound is present in a sufficient quantity to yield a potassium-to-calcium atomic ratio of about 2.0.

8. A process as defined by claim 1 wherein said carbonaceous solids comprise subbituminous coal.

9. A process as defined by claim 1 wherein said carbonaceous solids comprise lignite.

* * * * *